July 18, 1933.   C. A. ARENS   1,918,792
FLEXIBLE POWER TRANSMITTING DEVICE
Filed March 22, 1930   2 Sheets-Sheet 1
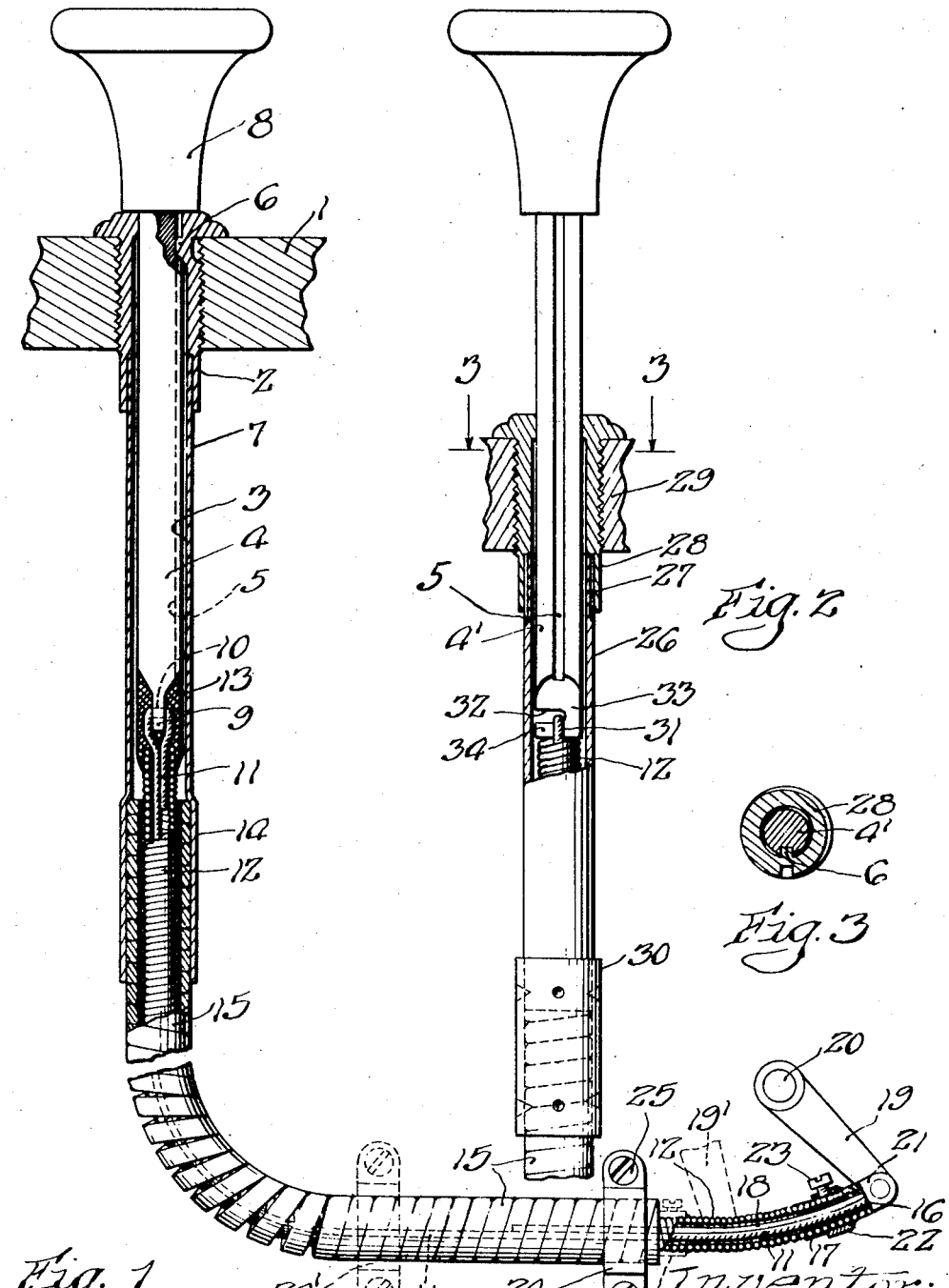

July 18, 1933.  C. A. ARENS  1,918,792
FLEXIBLE POWER TRANSMITTING DEVICE
Filed March 22, 1930  2 Sheets-Sheet 2

Inventor:
Charles A. Arens,
By Chas. M. Nissen,
Atty.

Patented July 18, 1933

1,918,792

UNITED STATES PATENT OFFICE

CHARLES A. ARENS, OF CHICAGO, ILLINOIS

FLEXIBLE POWER TRANSMITTING DEVICE

Application filed March 22, 1930. Serial No. 437,985.

The present invention relates to flexible control devices for operating movable parts located in inaccessible or remote places. More particularly this invention relates to flexible controls adapted to transmit a tensional or compressional force through a flexible element to the part to be operated.

One object of this invention is to provide not only a flexible control element but to also provide a flexible housing for said control element.

Another object of this invention resides in the provision of a flexible power transmitting element which slides longitudinally in a casing and protrudes therefrom at one end of the casing for the purpose of transmitting movement to a suitable part which is to be operated. The purpose of extending the flexible control element beyond the housing is for the purpose of permitting the flexible element to flex if necessary while transmitting power to the operated part. For instance in transmitting a force to a lever or arm movable about a pivot, necessarily the power transmitting control must move in a path other than a rectilinear, and must therefore be capable of bending.

Another object closely related to the object set forth in the previous paragraph is to provide a stiffening means near the ends of the flexible control to make that part of the flexible control less capable of bending than are the other parts of the control. More specifically, this object is for the purpose of reenforcing that part of the flexible control which extends beyond the housing so that this part of the flexible control will not bend or buckle when a compressional force is being exerted thereon.

A still further object of this invention is the provision of a flexible casing which may be secured in place by a bracket remote from be one end thereof so that if the flexible control within the housing or casing is provided with a rigid portion at the end thereof, the housing itself may be flexed to permit the control to operate a pivoted arm or the like.

Another object of this invention resides in a new and improved means for securing the operating element to the flexible control.

Still another object resides in the provision of novel means for assembling the various parts of the flexible control to make the same more efficient.

Other objects of this invention will appear hereinafter as the description of this invention proceeds.

In the drawings—

Fig. 1 represents a flexible control partly in section embodying my invention, parts thereof being shown in cross-section to better illustrate the manner in which the various parts of the control are constructed;

Fig. 2 shows a modified construction for a part of the control shown in Fig. 1;

Fig. 3 is a section taken on the line 3—3 of Fig. 2;

Figure 4:
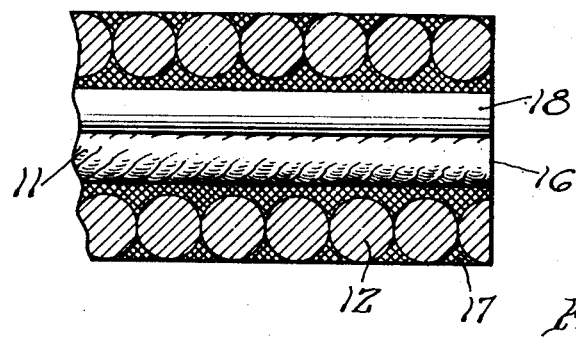
Fig. 4 is an enlarged sectional view of the end of the flexible control which is adapted to be connected to the operated member.

In devices of this nature it is desired to provide a flexible control member which will transmit both tensional and compressional forces without serious distortion of the control member and which will operate easily and efficiently to transmit forces through a casing in an angular direction if desired. In various mechanical constructions, and especially in power mechanisms, it is necessary at various times to operate an arm which is located at a remote position from the position of the operator and which may be so mounted that it is necessary that the operating part therefor must move in a path other than a rectilinear path. This invention relates to a mechanism for accomplishing these and like purposes. Furthermore this invention relates to a flexible control in which the flexible control is provided with a flexible housing which may be flexed to position the flexible control in proper operative relation to the operator's position and the part which is to be controlled.

In Fig. 1, the reference numeral 1 represents a relatively fixed support into which is screw threaded the bearing member 2 which is fitted over the tubular member 7 having a longitudinal bore 3 which receives the rod or rigid member 4. This rod slides freely longitudinally of the bore and may be provided with a groove 5 for receiving a struck up projection 6 on the member 2 to prevent the rod 4 from rotating within the tubular member. The rod 4 is provided with an operating knob 8 which is grasped by the operator to move the rod 4 longitudinally of the bore. The lower end of the rod 4 is cut away at two opposed sides thereof to leave a flat central portion 9 having an opening 10 extending therethrough. A flexible cable 11 formed of any desired number of strands of wire is strung through the opening 10 to form a loop approximately in the manner shown in Fig. 1. This flexible cable 11 extends through the interior of a coiled spring 12 which has the various coils arranged in abutting relation with each other for a purpose which will hereinafter appear. After the coiled spring 12 and cable 11 have been arranged in the position shown in Fig. 1, I surround the reduced portion 9 of the rod 4, cable 11 and the upper end of the spring 12 with a quantity of solder 13 which holds these parts in the relation illustrated in the drawings. Thus when a movement is imparted to the rod 4 by the operating knob 8, the cable 11 and the coiled spring 12 are constrained to move therewith.

The lower end of the tubular member 7 is enlarged at 14 to receive one end of a flexible casing 15. The casing 15 is formed by a flat wire which is coiled in the manner illustrated in the drawings and provides a casing which is very strong and which resists endwise distortion to a greater extent than the ordinary flexible coiled housing which is formed from an ordinary coiled wire which is round in cross-section. In other words, by using a wire which is rectangular in cross-section and placing the longest dimension of the rectangular section lengthwise of the tubular casing, I am able to obtain a casing which resists distortion in the direction of its length to a greater extent than has heretofore been possible. It is very desirable in a construction of this nature to minimize as much as possible the overall dimensions thereof. When using a round wire to form the flexible casing it is necessary in order to obtain the same strength in a longitudinal direction as is obtained by my device, to use a wire having a considerable diameter and this naturally increases the outside diameter of the tubular casing if the inner diameter of the tubular casing is maintained the same. By using a flat wire therefor I am enabled to obtain a very strong casing with a minimum outside diameter and a maximum resistance to longitudinal distortion.

The flexible casing is adapted to be attached generally only at points near the ends thereof, the intermediate portion being entirely free from any support. In transmitting a compressional force by the flexible control member there is a resistance to its movement out of the casing by the part which is being operated. If the coils of the casing are not sufficiently strong in the direction of the longitudinal dimension of the casing, the compressional force exerted by the operator will tend to separate the adjacent turns of the coil if the operated member offers a considerable resistance to the movement of the flexible control. In other words, the compressional force must cause some action when the operator moves the control and if the operated element does not move in response to the movement of the operator's end of the control the tendency is for the flexible casing to have the adjacent turns thereof spread, and the result is that the operated element will not operate. Furthermore, one distortion of the casing is apt to cause somewhat permanent distortion thereof and continued distortion will make a permanent distortion which will interfere with the proper operation of the control. For instance, if the control operates a carburetor, it is well known that the control is set for a particular adjustment of the carburetor. If the casing is stretched because the coil is not sufficiently strong in its longitudinal dimension, the result is that after the stretching, the position of the carburetor needle valve, or butterfly valve is different than that originally intended. In view of the extreme sensitivity of the carburetor, small differences in the position of the needle valve or butterfly valve cause great differences in the carbureting action. Hence it is necessary that the flexible casing be so constructed that its longitudinal dimension is not increased.

The cable 11 extends through the entire length of the coiled member and terminates at 16 within the portion 17 of the coiled member 12 which extends beyond the flexible casing 15. In order to strengthen the portion 17 of the coiled member 12, I insert a piece of piano wire 18 within the portion 17 and arrange this along side of the cable 11. This wire is more rigid than the flexible cable and tends to prevent excessive bending of the portion 17 which is arranged outside of the flexible casing 15 so that when a compressional force is exerted by means of the member 4, this projecting part 17 will not bend or buckle under the compressional force. That part of the coiled member 12 which lies within the casing 15 is prevented from buckling by the inner walls of the casing.

To permanently secure the cable 11, wire 18 and the coiled member 12 in proper relation to each other, I dip the end of the flexible member into a quantity of solder which fills all of the interstices between the cable, the coiled member and the wire (see Fig. 4). I may secure these parts together in any other desired manner although that described and illustrated is a very convenient and efficient manner of doing this.

In Fig. 1 I have illustrated the flexible control element as controlling the operation of the arm 19 pivoted at 20. The arm 19 has pivoted thereto a member 21 which carries as an integral part thereof a looped portion 22 of substantially the same inner diameter as the outer diameter of the coiled member 12 which passes through the looped member and is secured therein by means of the screw 23. The pivot 20 is fixed. Therefore, it will be seen that when the operator grasps the knob 8 and moves the member 4 upwardly or in a direction which draws the rod 4 out of the tubular member 7, the force exerted by the operator on the knob 8 is transmitted through the cable 11 to the portion 17 of the flexible control element and due to the fact that the cable is soldered to the coiled member 12, the arm 19 is rotated in a clockwise direction. Similarly if the operator moves the rod 4 back into its original position, this force exerted by the operator is transmitted from the rod 4 through the coiled member 12 to the arm 19 and the arm 19 rotates in a counter-clockwise direction. While either tensional or compressional forces may be exerted to rotate the arm 19, the stiffness in the coiled member 12 and the piano wire 18 prevents buckling of that portion of the flexible control 17 which extends outside of the casing 15. While I prefer to using a piano wire as a reinforcing means, it will be understood that I may use any other relatively rigid wire to reinforce the end of the flexible control or I may use any other reinforcing means which, while tending to stiffen the end of the control member, permits a certain amount of flexibility thereof. The end of the flexible casing 15 is rigidly secured to a relatively fixed support by means of a bracket 24 which is secured in place by means of screws 25. However, instead of permitting the free portion 17 of the flexible control to take all of the flexing, I may secure the bracket 24 in the dotted line position 24' or in other words at a point which is a relatively short distance from the end of the flexible casing 15 and at the same time secure the flexible control element within the loop 22 at a point adjacent the end of the tubular casing 15 such as illustrated in the drawings in dotted lines at 22', the arm 19 being positioned at 19'. With this arrangement when the member 8 is operated to move the rod 4 and coiled member 12 longitudinally of the casing 15, the arm 19' is rocked about its pivot and the end of the casing 15 between the bracket 24' and the right hand end thereof flexes to compensate for the fact that the end of the arm 19' does not move in a rectilinear path. This flexing of the end of the casing accomplishes substantially the same result as the flexing of the portion 17 in the arrangement shown in full lines, and at the same time the casing acts as an additional bracing means for the coiled member 12.

In Fig. 2 I have illustrated a modified arrangement for securing the parts at the operator's end of the control element together. In this arrangement the tubular member 26 has serrations 27 around the upper end thereof and the bearing member 28 which is screw threaded into the support 29 is driven over the serrated portion of the tubular member 27 and the serrations imbed themselves in the bearing member 28 and thereby hold the members 28 and 26 in fixed relation with each other. In Fig. 1 these parts are secured together by a press fit or by means of solder. Similarly in Fig. 1 the enlarged portion 18 is soldered to the casing 15. However, as shown in Fig. 2 I may provide an enlarged coupling member 30 which surrounds the end of the tubular member 26 and the abutting end of the flexible casing 15 and secure the member 30 to the tubular member 26 and the casing 15 by means of prick-punches made in the member 30 after the member 30 is arranged over the tubular member 26 and the casing 15. In Fig. 2 as well as in Fig. 1, the rod 4' is prevented from rotating by means of a struck up lug 6.

In the modification illustrated in Fig. 2 I provide an arrangement in which I do not use solder to connect the tubular member 4' with the cable and with the coiled element 12. The manner in which I secure these parts to each other is to form a loop 31 in the end of the cable and provide a slot 32 in the rod 4', it being understood that the rod 4' has a reduced portion 33 the same as the portion 9 in Fig. 1. Before inserting the rod 4' into the tubular member 26 I place the loop over the projection 34 formed by the slot 32 and bring the end of the coiled member 12 into engagement with the projection 34 and with the coiled member 12 in firm engagement with the projection 34. I solder the other ends of the cable and the coiled member 12 together along with a piece of piano wire in the same manner as illustrated in connection with Fig. 1. Thereafter, I insert the control element in the casing and tubular member. Since the rod 4' in the direction of the slot 32 is substantially the same dimension as the diameter of the tubular member 26 the loop 31 cannot slip off the projecion 34 although this construction permits the ready removal of the rod 4' from the loop 31 when the flexible control is out of the casing.

Figure 5:
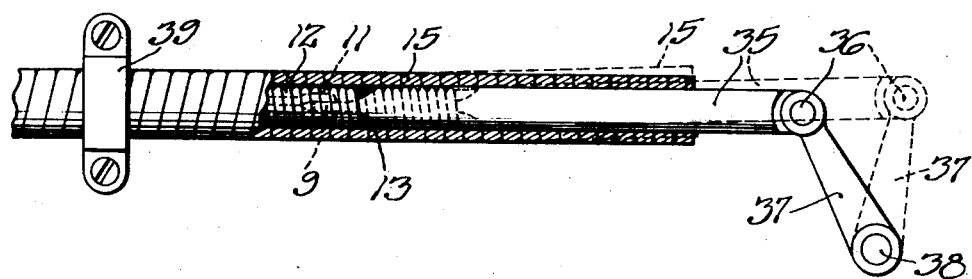
Fig. 5 shows a modified arrangement of the flexible control.

In Fig. 5 I have illustrated a still further modification of my device in which I may provide the operating end of the flexible control with a rigid rod 35 secured to the flexible element 12 in the same manner in which the rods 4 or 4' are secured to coiled element 12 in Figs. 1 or 2, and guide this rod 35 within the end of the casing 15. The end of the rod which extends beyond the casing may be pivoted at 36 to an arm such as the arm 37 and may impart movement to the arm 37 in a manner similar to that described in connection with Fig. 1. The arm 37 is pivoted on the fixed pivot 38.

When using the rigid rod 35 in place of a flexible end of the control element I secure the bracket 39 in spaced relation to the end of the housing 15, and at least a sufficient amount to permit flexing of the end of the casing 15 laterally of its longitudinal dimension. Assuming now that the parts are in the full line position, it will be seen that as a compressional force moves the coiled element 12 to the right, the rod 35 will rock the arm 37 but due to the fact that the pivot 36 moves in an arcuate path, there will be a tendency for the right hand end of the rod to move upwardly into the dotted line position. This is possible due to the fact that the flexible end 15 of the casing is freely supported so that the same may flex at a position between the left hand end of the rod 35 and the bracket 39 while supplying a straight bearing portion for the rod 35.

It will be understood that while I have shown an operating knob such as the knob 8 and a rod 4 for moving the flexible control, that if desired, both ends of the flexible control may be constructed the same as the end portion 17 which projects beyond the casing 15 in Fig. 1, or in the manner illustrated in Fig. 5. Furthermore, I may desire to use some other mechanism for operating the rod 4 and I may use a control such as a control shown in Fig. 5 for operating the rod 4 in Fig. 1, and in which the arm 37 shown in Fig. 5 is the operating element and not the operated element. Also I may construct one end of the flexible control as shown in Fig. 5 and the other end of the flexible control in the manner illustrated at the lower right hand portion in Fig. 1.

This device is particularly applicable to automobile motors, out-board motors, aeroplanes and other like devices. However, I do not wish to limit myself in the particular application of this device as it is a device of general application which may have a wide variety of uses other than those which I have specified.

Obviously those skilled in the art to which this invention pertains may make various modifications in the devices which I have illustrated without departing from the spirit of the invention, and I do not wish to be limited in my invention except as set forth in the appended claims.

Having thus fully described several modifications of my invention, what I desire to secure by Letters Patent of the United States is:

1. A flexible control for transmitting power comprising a casing, a coiled member extending through said casing and beyond one end thereof, a flexible tension member extending through said coiled member, an additional flexible member of less flexibility than said first mentioned member adapted to be arranged parallel with said first mentioned flexible member in the part of said coiled member which extends beyond said casing, and means securing both of said flexible members and said coiled members together.

2. A device as claimed in claim 1, comprising an operating element for exerting a pull on said first mentioned flexible member and also a compressional force on said coiled member.

3. A flexible control comprising a casing, a coiled member extending through said casing, an operating member arranged within said casing and operatively connected to said coiled member, a flexible member connected to said operating member and arranged parallel to said coiled member, said flexible member and coiled member extending beyond said casing, a stiffening member having substantial rigidity against lateral bending, stiffening substantially only the portions of said coiled member and said flexible member which extend beyond said casing so as to prevent excessive bending of said flexible member and coiled member transversely to the longitudinal dimension thereof, and means securing said coiled member, said flexible member and said stiffening member together.

4. A flexible control comprising a rigid housing, a flexible housing operatively connected therewith, a rod slidable in said rigid housing, a coiled member extending through said flexible casing, the coils of said coiled member being arranged close together, a flexible tension exerting element extending through said coiled member, means operatively connecting said rod with said coiled member and said flexible element, said coiled member and said flexible element being sufficiently long to extend through said flexible housing and protrude from said flexible housing at the end thereof opposite the end to which said rigid housing member is attached, a second flexible element of greater rigidity than said first flexible element arranged within that portion of the coiled member which extends beyond said flexible housing, and means securing said coiled member and said flexible elements together at a point beyond the end of said flexible housing.

5. A flexible control comprising a casing, a coiled member extending through said casing and of substantially the same outer diameter as the interior diameter of said casing, a flexible relatively inextensible member extending through said coiled member, means holding said flexible member and said coiled member together against substantial longitudinal shifting movement with respect to each other, said coiled member and said flexible member extending beyond the casing at one end thereof, said coiled member having a piano wire extending therethrough adjacent said flexible member and arranged substantially only in that portion of said coiled member which during the operation of said coiled member extends beyond the end of said casing, and means holding said flexible member, said piano wire, and said coiled member together against any substantial longitudinal shifting movement with respect to each other so that the same move substantially in unison with each other as a single unit.

6. A flexible control for transmitting power comprising a casing, a coiled member extending through said casing and beyond one end thereof for transmitting a compressional force, a flexible tension member extending through said coiled member and extending beyond the end of said casing and means holding the extending portions of said flexible members in fixed relation with each other, and reinforcing means reinforcing substantially only the portion of said flexible control which extends outside of said casing to make the same of less flexibility than the major portion of the combined compression and tension transmitting unit which is arranged within said casing.

7. In a flexible power transmitting device, the combination with an outer casing, a flexible coiled control member arranged within said casing and protruding beyond one end thereof for transmitting a compressional force, a flexible tension transmitting member arranged within said flexible compressional transmitting member, means holding the portions of said members which extend beyond said casing in fixed relation with each other so that the same move longitudinally as a unit, and means reinforcing substantially only that portion of the flexible control comprising the tension and compression transmitting members which extends beyond the casing to make that portion of the flexible control of less flexibility than the major portion thereof arranged within said casing.

8. In a flexible control unit, the combination of a casing, and a laterally flexible tension and compression transmitting element extending through said casing and beyond the end thereof adapted to impart movement to a part located beyond the end of said casing and having the portion thereof which moves into and out of a position beyond the casing laterally flexible, but of substantially less flexibility than the portion within said casing.

9. A flexible control unit comprising a flexible casing, a flexible element extending through said casing comprising a helically wound compression element and a wire extending through the center of said helically wound compression element for transmitting tension, said tension and compression transmitting elements extending beyond said casing and held in fixed relation with respect to each other beyond said casing and having that portion thereof which is adapted to extend beyond said casing of substantially greater rigidity than the portion which moves only within said casing, and means holding said casing against longitudinal movement at a point spaced an appreciable amount from the end of said casing whereby the flexible end of said casing can flex laterally.

10. A flexible control member for transmitting power comprising a casing, a coiled compression transmitting member extending through said casing and beyond one end thereof, a flexible tension transmitting member extending through said coiled member and beyond the end of said casing, an additional flexible member arranged parallel with said first mentioned flexible member in the part of said coiled member which extends beyond said casing, thereby reenforcing that portion of the coiled member so that the same may flex laterally but substantially prevent any buckling of the portion of said coiled member outside of said casing, said additional flexible member being inextensible in the direction of the length of said first flexible member, and means securing both of said flexible members and said coiled member together.

11. In a flexible control, the combination with a casing, of a flexible coiled member extending through said casing and protruding beyond one end thereof, a tension transmitting element arranged within said coiled member and also extending beyond the end of said casing, means securing said coiled member and tension transmitting element together beyond the end of said casing, and a relatively stiff piano wire associated with the ends of said coiled member and flexible tension transmitting element which extends beyond said casing for reenforcing that portion of the flexible control which extends beyond said casing while at the same time permitting lateral flexing thereof, said piano wire being substantially straight and parallel to the longitudinal dimension of said tension transmitting element and extending substantially only throughout the extent of that portion of the coiled member and tension transmitting element which extend beyond the casing.

CHARLES A. ARENS.